Dec. 2, 1969   W. H. BRENNAN ETAL   3,481,189

STRAIN GAGE MEASURING SYSTEM

Filed June 30, 1967

INVENTORS
WILLIAM H. BRENNAN
BY   RUDOLPH J. WOLF, JR.

Edward M. Farrell

ATTORNEY

United States Patent Office 3,481,189
Patented Dec. 2, 1969

3,481,189
STRAIN GAGE MEASURING SYSTEM
William H. Brennan, Phoenixville, and Rudolph J. Wolf, Jr., Worcester, Pa., assignors, by mesne assignments, to Automation Industries, Inc., a corporation of California
Filed June 30, 1967, Ser. No. 650,470
Int. Cl. G01b 7/18
U.S. Cl. 73—88.5     10 Claims

ABSTRACT OF THE DISCLOSURE

A measuring system for measuring strain in a concrete body includes an elongated metal rod having a flat portion with a strain gage mounted thereon. A housing includes a pair of protective barriers for the strain gage to protect it from moisture and mechanical damage. The housing is adapted to be embedded into the concrete body.

Background of the invention

In many cases, it is desirable to measure strain within a concrete body. For example, buildings within which testing takes place often require measurements relating to the effect of the testing within the building. Such testing, for example, could include explosions or mechanical testing involving heavy vibrations. As is well known, resistance strain gages exhibit the property of changing resistance in proportion to applied strain.

In many concrete buildings, it is customary to insert reinforcement metal rods within the concrete. These metal rods provide additional strength or reinforcement for the concrete bodies.

It has been known to utilize the metal rods with various test equipment. In the main, the test equipment was often installed on the rods at the site of the building. This made it difficult to install the test equipment under controlled conditions thereby making it difficult and expensive to provide a reliable test system.

Among some of the problems encountered in measuring systems connected with concrete strain measurements are those related to temperature variations in the measuring units and in the lead wires associated therewith. Also resistance to ground tends to introduce inaccuracies unless adequate water proofing is present. Perhaps the most important requirement that must be met is that the measurement system maintain its accuracy over very long periods of time.

Summary

In accordance with the present invention, a strain gage measuring system is employed to measure the strain set up within a concrete body. Strain gages are mounted to a flattened portion of a metal rod inserted in the concrete body. A metallic tube is disposed around a strain gage and the rod. A moisture protective material, such as wax, is disposed within the tube to cover the strain gage. A second protective barrier includes a hard material such as epoxy enclosed by a suitable sleeve member. A cable is employed to provide power to the strain gage as well as connecting the output signal from the strain gages to a suitable indicator. The measuring system on the rod is adapted to be inserted into the concrete body as the concrete is poured. Variations in the strain within the concrete will be transmitted to the metal rod to control the output signals from the strain gages.

Brief description of the drawings

Other features and advantages of the present invention will be apparent and suggest themselves to those skilled in the art from a reading of the following specification and claims in connection with the accompanying drawing, in which:

Detailed description of the drawings

Figure 1:
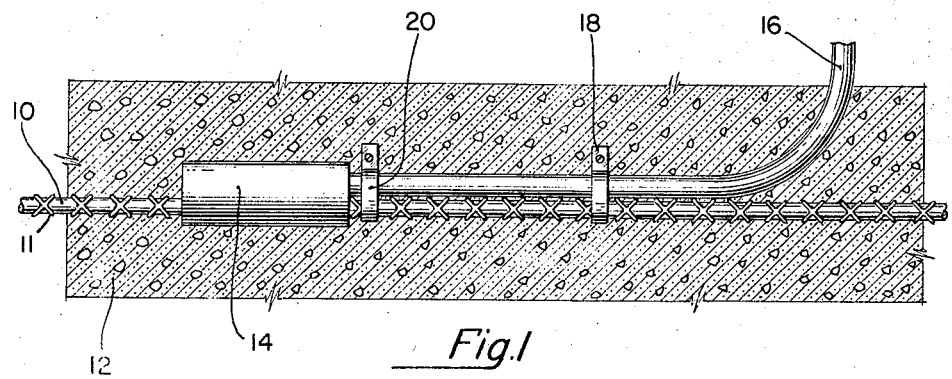
FIG. 1 illustrates a metal embedded rod in a concrete body having measuring means thereon, in accordance with the present invention.
Figure 2:
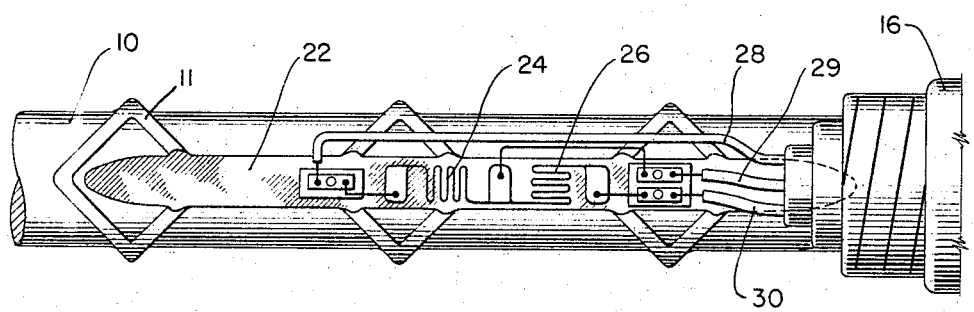
FIG. 2 is a top view of the measuring means of FIG. 1 without the surrounding protective means.

Referring particularly to FIG. 1, a metal rod 10 is disposed within a concrete body 12, which may comprise the wall or other portions of a building, for example. A measurement unit 14 is secured to the metal rod 10. A cable 16 for applying power to the measurement unit 14 and for connecting output signals from the measurement unit to a remote indicator, not illustrated, is connected to the metal rod 10 by means of a pair of clamps 18 and 20.

In practice, the metal rod 10 may be similar to numerous other metal rods which are normally used as reinforcements in the concrete body. However, the particular rod 10 and the measurement unit 14 along with the various other parts including the cable 16, may be preassembled. This permits the measurement unit 14 to be made under controlled conditions to assure high accuracy and to eliminate the necessity of making the installation in the field where it is difficult to properly control the installation because of other construction activities being carried on.

After the metal rods, including the rod 10 have been installed, the concrete is poured around the metal rod. The concrete makes intimate contact with the metal rod 10, which includes a plurality of intersecting rib portions 11, so that any strains within the concrete is transmitted to the rod 10 and to strain gage units within the measurement unit 14, as will be described. Because of the mechanical and electrical construction of the measurement unit 14, the unit may be installed without being affected by mechanical mishandling and the like as may normally take place at a construction site.

The metal rod 10 includes a flat portion 22 adapted to receive a strain gage thereon. In the embodiment illustrated, a pair of strain gages 24 and 26 are mounted to the flat portion 22 by suitable adhesive means. One of the gages may be parallel to the axis of the rod and the other transverse thereto.

A pair of strain gages is employed rather than a single strain gage to provide some temperature compensation since it can be reasonably assumed that factors affecting one of the gages will also affect the other. Since the strain gages may be electrically connected so that one effect may cancel the other, the strain gages involving a half bridge network is advantageous. Also, the use of two strain gages in the manner illustrated increases the sensitivity of the measuring system due to the Poisson effect.

Various lead wires 28, 29 and 30 within the cable 16 are used to connect a source of power to the strain gages 24 and 26 and to apply signals developed by the strain gages to a remote indicator.

Figure 3:
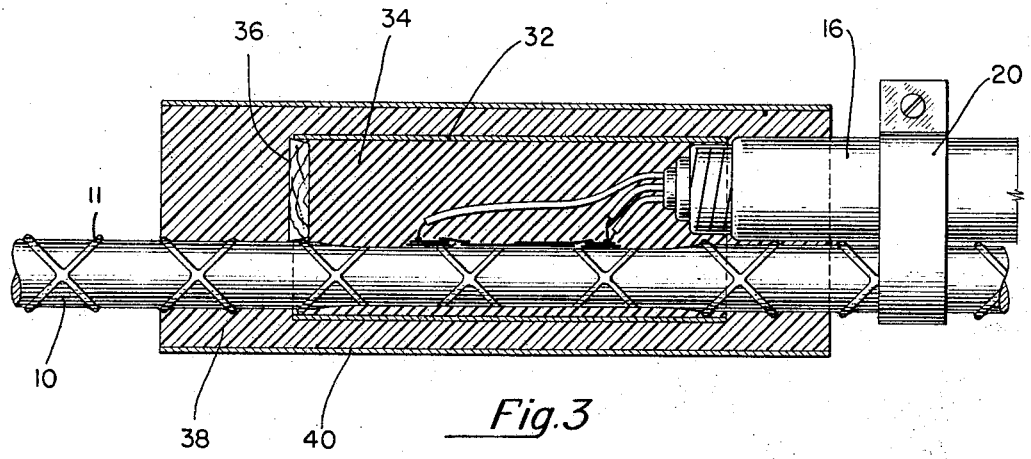
FIG. 3 is a side view partly in cross section illustrating the various components included in the measurement means.

Referring particularly to FIG. 3, the rod 10 and its associated strain gages is surrounded by a steel tube 32. Within the steel tube 32 is a wax material 34, which may be poured into the tube 32 during manufacturing. The wax provides a moisture barrier for the strain gages 24 and 26. At the same time, because the wax material 34 is relatively soft, the strain gages 24 and 26 are free to operate unobstructed. A wooden peg 36 may be wedged between the rod 10 and the tube 32 during the assembly and insertion of the wax material. The assembly held rigidly in place by the wedge 56 and the clamp 20.

The wax provides a moisture protective barrier which protects the strain gages from the wet concrete as it is being poured. In addition, the moisture barrier minimizes the resistance to ground which may offset the accuracy of measurements.

A relatively hard material, which may be a form of epoxy 38, is disposed around the entire assembly including the steel tube 32. This material provides mechanical protection for the strain gages. The epoxy may be surrounded by a polyvinyl chloride sleeve element 40.

The entire assembly described may be completed at the factory under controlled conditions. Once the assembly is completed, the pair of barriers are provided to protect the strain gage units from moisture as well as from mechanical shock and vibration. This permits the extension rod 10 to be inserted at the building site with the concrete being poured around it without adversely affecting the calibrations of the strain gage units.

In addition to providing some waterproofing, the wax material 34 acts as a chemically inert material which does change its characteristics over a long period of time thereby protecting the strain gages over a long period without affecting their normal operations. The epoxy material 38, while described generally as a hard material, has a certain amount of resilience to protect the strain gages from external mechanical shocks and returning to its original shape. Of course the epoxy material also provides protection for the strain gages against moisture and other adverse conditions.

It is noted that the rod 10 may include two flat portions, as illustrated. This arrangement minimizes the tendency of the rod to bow in one direction when it is installed, as it may tend to do if a single flat portion is used. The second flat portion may also be used to receive additional strain gages if desired.

The metal tube 32, which may be aluminum or other suitable material may be deformed slightly into an elliptical shape to provide a mechanical lock over the rod 10 and cable 16 during initial assembly. The arrangement including the peg 36 holds the entire assembly tightly in place during and after manufacture.

What is claimed is:
1. A strain gage measuring system for measuring strains set up in a concrete body comprising:
   an elongated metal rod adapted to be embedded in said concrete, said rod having a relatively flat portion for receiving strain gage means thereon;
   a metallic tubular element and a first and a second protective barrier for shielding said strain gage means, said first protective barrier being surrounded by said metallic tubular element and being disposed to cover said strain gage means, said second protective barrier comprising a relatively hard material and being disposed around said first protective barrier and said tubular element; and
   cable means being coupled to said strain gage means.
2. The strain gage measuring system as defined in claim 1 and further including a wedge element inserted between said tubular element and said rod,
3. The strain gage measuring system as defined in claim 1 wherein said first protective barrier comprises a chemically inert material.
4. The system as defined in claim 1 wherein said first protective barrier comprises a wax material.
5. The system as defined in claim 1 wherein said second protective barrier comprises a relatively hard resin material.
6. The system as defined in claim 1 wherein:
   said first protective barrier comprises a wax material; and
   said second protective barrier comprises a relatively hard resin material.
7. The system as defined in claim 1 wherein said second protective barrier is surrounded by a sleeve element.
8. The system as defined in claim 1 wherein said strain gage means comprises a pair of strain gages being disposed in transverse relation with respect to each other.
9. The system as defined in claim 1 wherein:
   said second protective barrier comprises a relatively hard resin material; and
   said strain gage means comprises a pair of strain gages being disposed in transverse relation with respect to each other.
10. The system as defined in claim 1 wherein:
   said first protective barrier comprises a wax material
   said second protective barrier comprises a relatively hard resin material and is surrounded by a sleeve element; and
   said strain gage means comprises a pair of strain gages being disposed in transverse relationship with respect to each other.

References Cited
UNITED STATES PATENTS

| 3,089,107 | 5/1963 | Dean | 338—2 |
| 3,228,240 | 1/1966 | Ormond | 73—141 |

OTHER REFERENCES

Perry and Lissner: The Strain Gage Primer, 1962, pp. 174–181.

CHARLES A. RUEHL, Primary Examiner

Dedication 3,481,189.—*William H. Brennan*, Phoenixville & *Rudolph J. Wolf, Jr.*, Worcester, Pa. STRAIN GAGE MEASURING SYSTEM. Patent dated Dec. 2, 1969. Dedication filed July 8, 1982, by the assignee, *Vishay Intertechnology, Inc.*

Hereby dedicates to the Public the remaining term of said patent with all issued claims.

[*Official Gazette Aug. 31, 1982.*]